United States Patent
Lahteenmaki et al.

(10) Patent No.: US 8,713,671 B2
(45) Date of Patent: Apr. 29, 2014

(54) SYSTEM AND METHOD FOR PROVIDING AN EXTENDED PLATFORM FOR AN OPERATING SYSTEM

(75) Inventors: Mika Lahteenmaki, Tampere (FI); Timo Heikkinen, Tampere (FI)

(73) Assignee: Nokia Corporation, Espoo (FI)

( * ) Notice: Subject to any disclaimer, the term of this patent is extended or adjusted under 35 U.S.C. 154(b) by 1648 days.

(21) Appl. No.: 11/265,710

(22) Filed: Nov. 2, 2005

(65) Prior Publication Data

US 2007/0124564 A1    May 31, 2007

(51) Int. Cl.
    *G06F 21/00*    (2013.01)
(52) U.S. Cl.
    USPC .................................. 726/17; 726/21; 707/783
(58) Field of Classification Search
    USPC ..................... 717/139, 162, 165, 167; 726/17; 713/167, 164; 719/328, 332
    See application file for complete search history.

(56) References Cited

U.S. PATENT DOCUMENTS

| | | | |
|---|---|---|---|
| 6,088,801 A * | 7/2000 | Grecsek ............................. | 726/1 |
| 6,314,566 B1 * | 11/2001 | Arrouye et al. ............... | 717/148 |
| 6,330,670 B1 | 12/2001 | England et al. | |
| 7,284,124 B1 * | 10/2007 | Ginsberg ....................... | 713/167 |
| 2002/0099944 A1 * | 7/2002 | Bowlin ........................... | 713/185 |
| 2004/0015694 A1 * | 1/2004 | DeTreville .................... | 713/172 |
| 2006/0053426 A1 * | 3/2006 | Dive-Reclus et al. ......... | 719/328 |
| 2006/0117305 A1 * | 6/2006 | Tarkkala ....................... | 717/139 |
| 2008/0022292 A1 * | 1/2008 | Gibson .......................... | 719/328 |

OTHER PUBLICATIONS

Gong, "On Security in Capability-Based Systems", portal.acm.org, Nov. 1988, p. 56-60.*
Dive-Reclus et al. Symbian OS Platform Security Architecture, Apr. 4-5, 2005, Westminster University, Cavendish School of Computing Science, Wireless Information Technology Research Centre, 3rd International Workshop in Wireless Security Technologies, pp. 24-33.*
International Search Report for PCT Application PCT/IB2006/003094.

* cited by examiner

*Primary Examiner* — Michael R Vaughan
(74) *Attorney, Agent, or Firm* — Banner & Witcoff, Ltd

(57) ABSTRACT

A system and method of adding programming to a Symbian operating system. A binary component for use by the operating system, with the binary component including both a capability level and a trust level. The trust level is either equal to or higher than the capability level. If the trust level of the binary component is equal to or higher than the capability of a calling process the calling process automatically loads the binary component.

20 Claims, 3 Drawing Sheets

SYSTEM AND METHOD FOR PROVIDING AN EXTENDED PLATFORM FOR AN OPERATING SYSTEM

FIELD OF THE INVENTION

The present invention relates generally to a platform for operating systems such as the Symbian Operating System (OS). More particularly, the present invention relates to the process of loading plug-in components for use with the Symbian Operating System.

BACKGROUND INFORMATION

The Symbian Operating System is an advanced, open, standard operating system that is used for wireless computer and telephony. The Symbian OS includes sufficient flexibility and scalability to be used in a variety of mobile telephones having a wide range of particular user requirements.

The current platform security model in the Symbian OS provides capabilities for each binary component, particularly executable files having a .exe extension and dynamic link library files having a .dll extension. Capabilities are given by the operating system to the components at installation time. Client-server applicant program interfaces (API's) can check the capabilities of a calling process and determine if the calling process has a high enough capabilities to call the API. The capabilities of the calling process is determined by the executable code that has been used to create the calling process. A calling process cannot load components that have lower capabilities than what the calling process has itself.

The model described above has the problem that it is very difficult for the calling process to load a plug-in framework, which might consist of dozens of binary components with different capabilities. The plug-in framework is an important concept in Symbian OS.

SUMMARY OF THE INVENTION

According to the principles of the present invention, the binary component, typically an EXE or DLL component, is assigned a "trust level." With the present invention, the capability still describes what the component is capable of doing, and the trust level indicates the degree to which the component is trusted. The trust level is assigned to the binary components in the same way as the capability. According to the principles of the present invention, the calling processes can load DLL's with the same or higher trust level without affecting the capability of the calling process. The calling process can manually load a DLL with a lower capability or trust level. In the present invention, the capability of the calling process is decremented to correspond to the highest capability allowed by the lowest trust level in the system, making the trust level the determining factor.

The present invention provides several advantages over conventional implementations. In particular, with the present invention, Symbian OS platform security ideas operate in an improved manner with the plug-in frameworks over conventional systems. The present invention also increases the security of the whole platform security concept. The trust level described herein is introduced so that the capability level will not be the only factor to control .dll files that a calling process can load.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

As discussed above, a conventional platform security model provides capabilities for each binary component, particularly EXE/DLL components. These capabilities are provided by the operating system to the components at installation time. Client-server API's can monitor the capability of the calling process and determine if the calling process has a high enough capability to call the API. The capabilities of the calling process are determined by the executable code that has been used to create the calling process. Conventionally, a calling process cannot load components that have lower capabilities than what the calling process itself has.

As discussed previously, the model described above has the problem that it is quite difficult for the calling process to load a plug-in framework, which might include several dozen DLL's with different capabilities. The plug-in framework is an important concept in Symbian operating systems.

The present invention addresses the above-identified issues in an easy-to-implement manner. In addition to capability, the binary component is also assigned a "trust level." According to the principles of the present invention, the capability describes what the component is capable of doing, and the trust level indicates the degree to which the component is trusted by the system. For example, a typical system library has a high trust level because it is implemented by Symbian, and it is known that it has been implemented in a proper manner. The same library may have a low capability level if it is not designed to perform any security critical functions like displaying digital rights management (DRM) protected content or for using phone functions. The trust level is assigned to the binary components in the same way as the capability is assigned.

Figure 1:
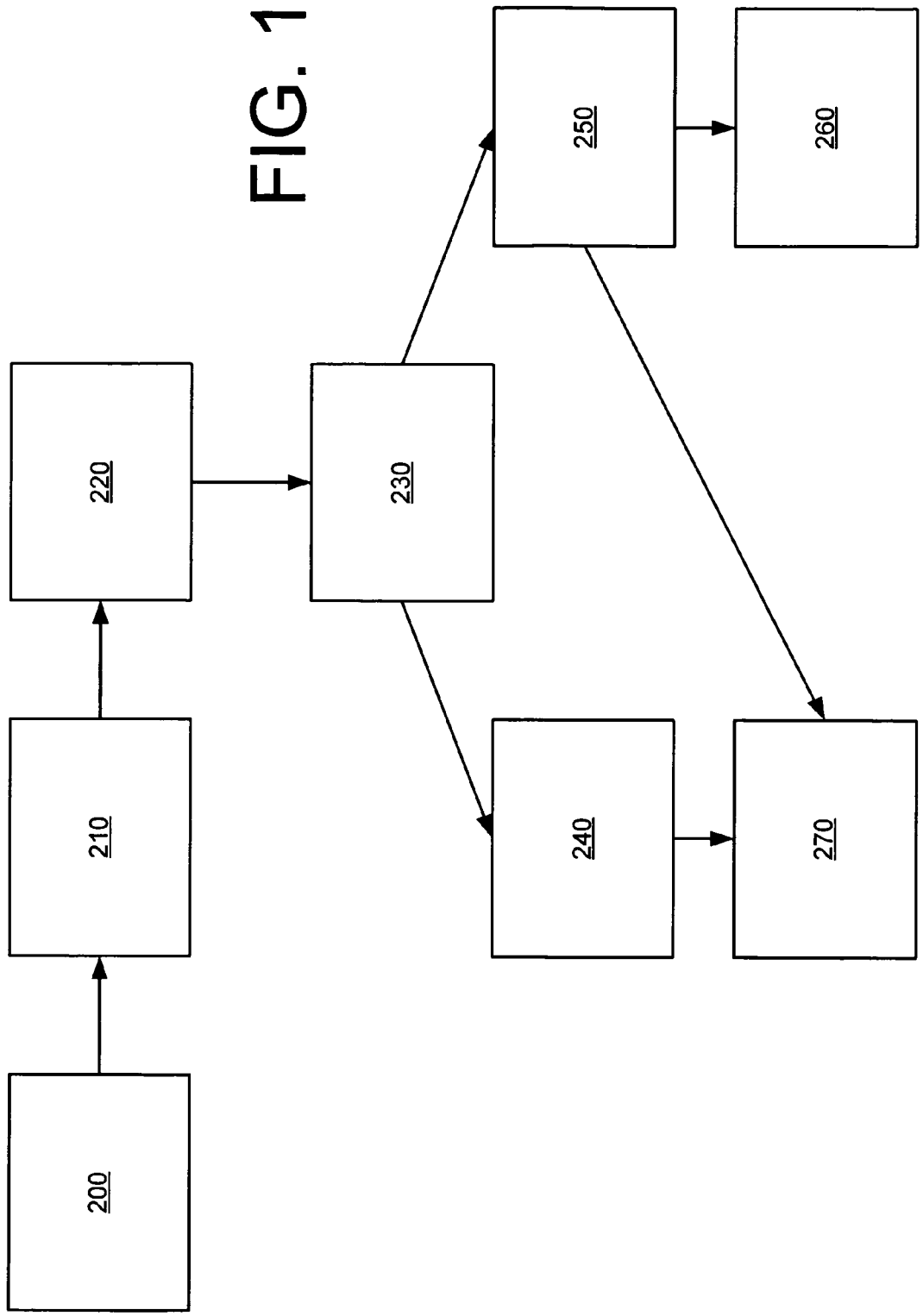
FIG. 1 is a flow chart showing the implementation of one embodiment of the present invention.

Trust levels and capabilities operate as follows according to one embodiment of the present invention. A generic form of this process is depicted in FIG. 1. At step 200, a particular binary component is provided for potential use by the operating system. This binary component often takes the form of a .dll file or a .exe file. Currently, a calling process has only a capability level, assigned at step 210, but not a trust level. In the present invention, the trust level is assigned at step 220. It should be noted that steps 210 and 220 can occur in the opposite order or could occur substantially simultaneously. The capability of the calling process is determined at step 230 by the capability of the executable (EXE) component which is loaded first. The calling process can load DLL's with the same or higher trust level without affecting the capability of the calling process. DLL's with the same or higher trust level are automatically downloaded at step 240.

According to the present invention, the capability of the calling process is decremented to correspond to the highest capability allowed by the lowest trust level in the system. Therefore, if the DLL has lower capability than the trust level, then the capability of the calling process will be based upon that capability only if there is no higher capability in the system which would be, e.g., equal to the trust level of the DLL. The trust level of the binary component is either higher or the same as the capability. It cannot be lower.

A calling process can load a DLL with lower capability or trust level. However, according to the present invention, the loader does not implicitly load DLL's with lower trust levels. Instead, DLL's with lower trust levels need to be explicitly or manually loaded by the calling process because the capability of the calling process will be affected. This is represented at step 250. The load function of the operating system returns both the current capability and the new capability.

When a lower trust-level DLL is loaded to the calling process, there is a possibility that the DLL may contain malicious code, which will misuse the higher capability DLL's which are already loaded to the calling process. The operating system therefore provides a function to check the current capability of the calling process so that the higher capability DLL's may refuse to work if the capability of the calling process falls below the capability of the particular, higher capability DLL. This is represented at step 260 in FIG. 1.

When a DLL is later unloaded, represented at step 270, the loader will check all the DLL's in the calling process's address space from an internal table and determine a new capability to the calling process based upon the lowest trust level DLL. By this method, it is possible to unload a low trust level DLL and return the capability of the calling process to the original capability.

The following is one potential example showing the benefits of the present invention. In this example, a user may wish to load a DRM plug-in into a Multimedia Framework (MMF) that will 1) automatically obtain rights for some content if those rights doesn't already exist and 2) decrypt the content. The user may also wish to download a third party plug-in that will add a number of audio effects to the decrypted content. For these actions to work in a conventional system, the process that loads the multimedia file must have DRM and phone capabilities. However, the third party plug-in must have these same capabilities even though it actually does not perform any functions relating to these capabilities. In other words, if the third party developer wants to be sure that the plug-in works properly, it must provide the plug-in with maximum capabilities even though the software may only calculate a mathematical formula to given data. With the present invention, on the other hand, the third party developer can simply provide the third party plug-in with a high trust level, but with very low (or no) capabilities. The plug-in can therefore be loaded into virtually any process due to its high trust level.

In the embodiment of the present invention discussed above, both the trust level and the capability of the calling process can increase and/or decrease. In a variant of this embodiment, only the trust level can increase and/or decrease for the calling process. In still another variant of this embodiment, only the capability of the binary component can increase and/or decrease for the calling process.

Figure 2:
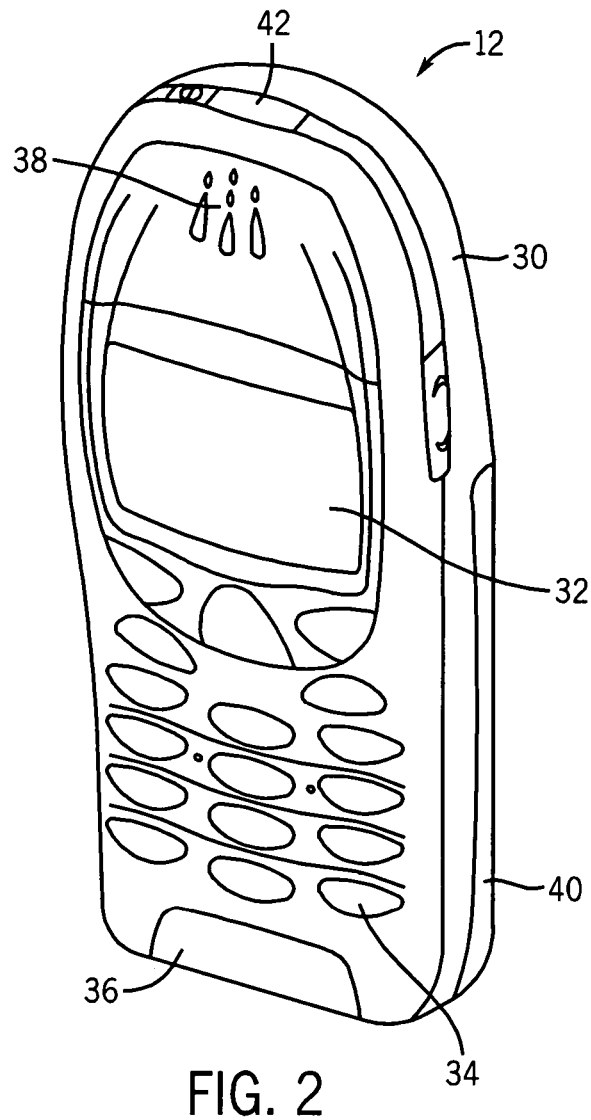
FIG. 2 is a perspective view of a mobile telephone that can be used in the implementation of the present invention.
Figure 3:
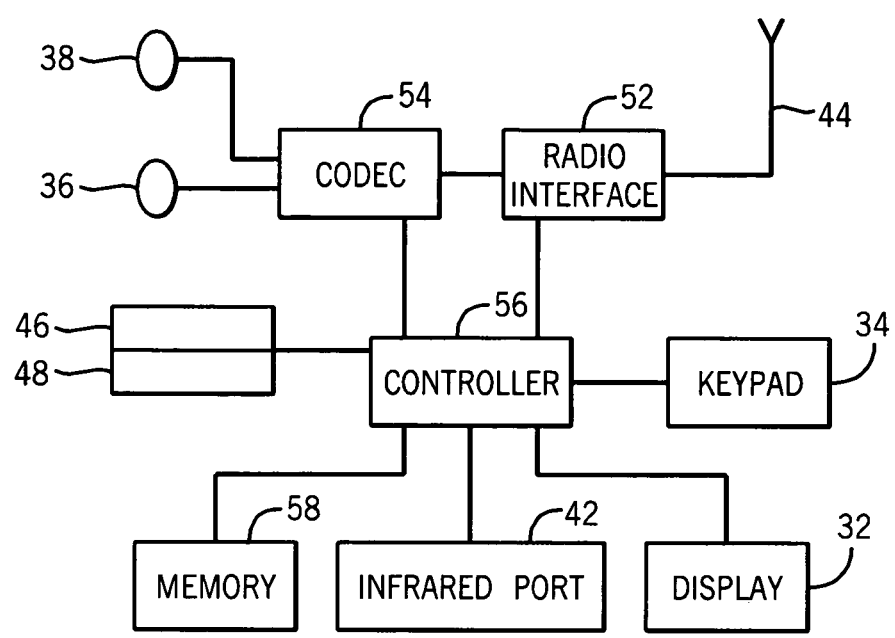
FIG. 3 is a schematic representation of the telephone circuitry of the mobile telephone of FIG. 2.

FIGS. 2 and 3 show one representative mobile telephone 12 upon which the present invention may be implemented. However, it is important to note that the present invention is not limited to any type of electronic device and could be incorporated into devices such as personal digital assistants, personal computers, and other devices. It should be understood that the present invention could be incorporated on a wide variety of mobile telephones 12. The mobile telephone 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a universal integrated circuit card (UICC) according to one embodiment of the invention, a card reader 48, radio interface circuitry 52, codec circuitry 54, a controller 56 and a memory 58. It should be noted that the controller 56 can be the same unit or a different unit than the camera processor 16. Individual circuits and elements are all of a type well known in the art, for example in the Nokia range of mobile telephones.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
receiving a binary component for use by an operating system;
assigning a binary component capability level and a binary component trust level to the binary component, the binary component capability level identifying capabilities of the binary component and the binary component trust level specifying trustworthiness of the binary component;
providing a calling process having a calling process capability level and a calling process trust level, wherein the calling process capability level exceeds the binary component capability level;
determining, by the calling process, that the binary component capability level is insufficient to load the binary component to trigger analysis of the binary component trust level; and
in response to determining that the binary component trust level is equal to or higher than the calling process trust level, automatically loading the binary component by the calling process.

2. The method of claim 1, further comprising:
receiving a second new binary component having a second binary component capability level;

determining that the calling process capability level exceeds the second binary component capability level; and reducing the calling process capability level to a new calling process capability level and loading the second new binary component by the calling process.

3. The method of claim 2, further comprising preventing at least one binary component in the operating system from working with the second new binary component in response to determining that the new calling process capability level is lower than a capability level of the at least one binary component.

4. The method of claim 2, further comprising:
unloading the second new binary component; and
determining a second new capability level for the calling process based upon a lowest trust level for a plurality of binary components remaining in the operating system.

5. The method of claim 1, wherein the binary component includes a dynamic link library.

6. The method of claim 1, wherein the operating system comprises a Symbian operating system.

7. The method of claim 1, further comprising:
receiving a second new binary component having a second capability level; and
providing an indication that the second new binary component is not usable in response to determining that the second capability level is lower than the calling process capability level.

8. A non-transitory computer readable medium storing computer executable instructions that, when executed, cause an apparatus to at least:
receive a binary component for use by an operating system;
assign a binary component capability level and a binary component trust level to the binary component, the binary component capability level identifying capabilities of the binary component and the binary component trust level specifying trustworthiness of the binary component;
provide a calling process having a calling process capability level and a calling process trust level, wherein the calling process capability level exceeds the binary component capability level;
determine by the calling process that the binary component capability level is insufficient to load the binary component to trigger analysis of the binary component trust level; and
in response to determining that the binary component trust level is equal to or higher than the calling process trust level, automatically load the binary component by the calling process.

9. The non-transitory computer readable medium of claim 8, further storing computer executable instructions that, when executed, cause the apparatus to:
receive a second new binary component having a second binary component capability level;
determine that the calling process capability level exceeds the second binary component capability level; and
reduce the calling process capability level to a new calling process capability level and load the second new binary component by the calling process.

10. The non-transitory computer readable medium of claim 9, further storing computer executable instructions that, when executed, cause the apparatus to prevent at least one binary component in the operating system from working with the second new binary component in response to determining that the new calling process capability level is lower than a capability level of the at least one binary component.

11. The non-transitory computer readable medium of claim 10, further storing computer executable instructions that, when executed, cause the apparatus to:
unload the second new binary component; and
determine a second new capability level for the calling process based upon a lowest trust level for a plurality of binary components remaining in the operating system.

12. The non-transitory computer readable medium of claim 8, wherein the binary component includes a dynamic link library.

13. An apparatus comprising:
one or more processors; and
memory storing computer executable instructions that, with the one or more processors, cause the apparatus to at least:
receive a binary component for use by an operating system;
assign a binary component capability level and a binary component trust level to the binary component, the binary component capability level identifying capabilities of the binary component and the binary component trust level specifying trustworthiness of the binary component;
provide a calling process having a calling process capability level and a calling process trust level, wherein the calling process capability level exceeds the binary component capability level;
determine by the calling process that the binary component capability level is insufficient to load the binary component to trigger analysis of the binary component trust level; and
in response to determining that the binary component trust level is equal to or higher than the calling process trust level, automatically loading the binary component by the calling process.

14. The apparatus of claim 13, wherein the memory further stores computer executable instructions that, with the one or more processors, cause the apparatus to:
receive a second new binary component having a second binary component capability level;
determine that the calling process capability level exceeds the second binary component trust capability level; and
reduce the calling process trust capability level to a new calling process capability level and load the second new binary component by the calling process.

15. The apparatus of claim 14, wherein the memory further stores computer executable instructions that, with the one or more processors, cause the apparatus to prevent at least one binary component in the operating system from working with the second new binary component in response to determining that the new calling process capability level is lower than a capability level of the at least one binary component.

16. A module for use in an apparatus, the module comprising:
one or more processors; and
memory storing computer executable instructions that, with the one or more processors, cause the apparatus to at least:
receive a binary component for use by an operating system;
assign a binary component capability level and a binary component trust level to the binary component, the binary component capability level identifying capabilities of the binary component and the binary component trust level specifying trustworthiness of the binary component;

provide a calling process having a calling process capability level and a calling process trust level, wherein the calling process capability level exceeds the binary component capability level;

determine by the calling process that the binary component capability level is insufficient to load the binary component to trigger analysis of the binary component trust level; and in response to determining that the binary component trust level is equal to or higher than the calling process trust level, automatically loading the binary component by the calling process.

17. The module of claim 16, wherein the memory further stores computer executable instructions that, with the one or more processors, cause the apparatus to:

receive a second new binary component having a second binary component capability level;

determine that the calling process capability level exceeds the second binary component capability level; and reduce the calling process capability level to a new calling process capability level and load the second new binary component by the calling process.

18. The module of claim 17, wherein the memory further stores computer executable instructions that, with the one or more processors, cause the apparatus to prevent at least one binary component in the operating system from working with the second new binary component in response to determining that the new calling process capability level is lower than a capability level of the at least one binary component.

19. The module of claim 18, wherein the memory further stores computer executable instructions that, with the one or more processors, cause the apparatus to:

unload the second new binary component; and determine a second new capability level for the calling process based upon a lowest trust level for a plurality of binary components remaining in the operating system.

20. The module of claim 17, wherein the memory further stores computer executable instructions that, with the one or more processors, cause the apparatus to:

provide an indication that the second new binary component is not usable if the second binary capability level is lower than the calling process capability level.

\* \* \* \* \*